(12) United States Patent
Nilsen

(10) Patent No.: US 6,881,335 B2
(45) Date of Patent: Apr. 19, 2005

(54) APPARATUS AND SYSTEM FOR THE CONTAINMENT OF OIL SPILLS

(75) Inventor: Dag Nilsen, Tromsø (NO)

(73) Assignee: Nofi Tromso AS, Tromso (NO)

(*) Notice: Subject to any disclaimer, the term of this patent is extended or adjusted under 35 U.S.C. 154(b) by 85 days.

(21) Appl. No.: 10/343,484

(22) PCT Filed: Jul. 26, 2001

(86) PCT No.: PCT/NO01/00321
§ 371 (c)(1),
(2), (4) Date: Jan. 30, 2003

(87) PCT Pub. No.: WO02/12636
PCT Pub. Date: Feb. 14, 2002

(65) Prior Publication Data
US 2003/0141236 A1 Jul. 31, 2003

(30) Foreign Application Priority Data
Aug. 4, 2000 (NO) .......................................... 20003952

(51) Int. Cl.$^7$ .............................................. E02B 15/04
(52) U.S. Cl. .................................. 210/242.3; 210/923
(58) Field of Search ............................. 210/170, 242.1, 210/242.3, 540, 776, 923

(56) References Cited

U.S. PATENT DOCUMENTS

| 3,688,506 A | * | 9/1972 | Marcocchio et al. | 210/242.3 |
| 3,951,810 A | * | 4/1976 | Crisafulli | 210/242.3 |
| 3,983,034 A | * | 9/1976 | Wilson | 210/242.3 |
| 4,116,833 A | * | 9/1978 | Stagemeyer et al. | 210/242.3 |
| 4,139,470 A | * | 2/1979 | Stagemeyer et al. | 210/170 |
| 4,372,854 A | * | 2/1983 | Szereday | 210/242.3 |
| 4,388,188 A | * | 6/1983 | Morris | 210/242.3 |
| 4,588,501 A | * | 5/1986 | Jordan | 210/242.1 |
| 4,963,272 A | * | 10/1990 | Garrett | 210/923 |
| 5,019,277 A | * | 5/1991 | Andelin | 210/242.3 |
| 5,215,654 A | * | 6/1993 | Karterman | 210/923 |
| 5,409,607 A | | 4/1995 | Karlberg | |

FOREIGN PATENT DOCUMENTS

| DE | 29 36 151 B1 | 3/1981 |
| FR | 2.061.978 B1 | 6/1971 |
| NO | 176066 B1 | 10/1994 |

OTHER PUBLICATIONS

Teknisk Ukeblad, 143. argang, nr 47, Dec. 12, 1996, (ATLE Kjaervik/Sigurd Aarvik), "Bolgekraft-teknologi i ny olje-lense", p. 81.

* cited by examiner

Primary Examiner—Christopher Upton
(74) Attorney, Agent, or Firm—Darby & Darby

(57) ABSTRACT

An apparatus or system for containing oil and the like floating on the surface of a body of water, comprising a relatively elongate channel defined by two side-defining faces that diverge from one another from a narrow inner end to a wider opening, the channel being movable such as by towing with the aid of one or more vessels, which apparatus is made of non-rigid materials. The apparatus comprises a tapered channel portion between the two side-defining faces, a wedge-shaped structure and a collecting means or separator, wherein the tapered channel portion, the wedge-shaped structure and the separator are arranged one after the other as interconnected or integrated units, thereby forming a continuous "hull" having freeboard, and longitudinal towing devices are provided that are fastened to said units, the said towing devices and thus the towing forces intersecting in an area at the rear end of said wedge-shaped structure seen in the towing direction.

14 Claims, 4 Drawing Sheets

APPARATUS AND SYSTEM FOR THE CONTAINMENT OF OIL SPILLS

This is a U.S. national phase application under 35 U.S.C. §371 of International Patent Application No. PCT/NO01/00321, filed Jul. 26, 2001, and claims the benefit of Norwegian Patent Application No. 20003952, filed Aug. 4, 2000. The International Application was published in English on Feb. 14, 2002 as WO 02/12636 A1 under PCT Article 21(2).

BACKGROUND OF THE INVENTION

The subject invention relates to an apparatus or system for the containment of oil spills or the like floating on the surface of a body of water, comprising a relatively elongate channel defined by two side-defining faces that diverge from one another from a narrow inner end to a wider opening, the channel being movable such as by towing with the aid of one or more vessels, which apparatus is made of non-rigid materials.

A number of different ways of containing oil floating on the surface of a body of water are already known. The most common of these is to deploy a floating boom in a U or J formation. A separate skimmer is then used to remove the oil that is collected at the back of the boom. This system is uncomplicated and relatively inexpensive. The disadvantage is that the floating boom cannot be towed forwards at a speed of more than 0.5 to 1 knot since the oil will be pulled down into the body of water under the boom.

In areas where harsher weather conditions prevail such as on the open sea, a so-called V-sweep is used. This consists of an ordinary boom set up in a V formation with the aid of a net in the bottom that stabilises the system and gives it a shape. The oil that is collected at the back of the system is pumped up using a separate skimmer. Containment can take place at a speed as high as 1 to 1.6 knots before the oil is pulled down under the boom. Nonetheless, this speed is also too low as the ocean currents in many cases have a greater speed. In addition, the oil often gathers in so-called scattered slicks where 90% of the oil is in 10% of the area, and on moving between scattered slicks of this kind the oil is often lost because of movement above the critical speed.

Norwegian Patent 176066 discloses an oil containment system that harnesses wave energy and is in the form of a relatively elongate channel having a side edge face and a defined edge over which waves containing oil are to wash as they pass into a catch basin. It is disclosed that the elongate channel may also have a bottom and that the system can be made of non-rigid materials. However, in practical tests using this system, it was found that when the system is towed forwards in the water major stability problems arise because of the relatively elongate shape, as the system either seeks to go down into the body of water or to come up. Substantial adjustment means are required to be able to cause the system to function in a satisfactory manner at varying high speeds.

The object of the present invention is to eliminate the problems of the known apparatuses and systems.

SUMMARY OF THE INVENTION

This object above is achieved with an apparatus or a system of the type mentioned in the introduction comprising a tapered channel portion between the two side-defining faces, a wedge-shaped structure and a collecting means or separator, wherein the tapered channel portion, the wedge-shaped structure and the separator are arranged one after the other as interconnected or integrated units, thereby forming a continuous "hull" having freeboard, and longitudinal towing devices are provided that are fastened to the units, the said towing devices and thus the towing forces intersecting in an area at the rear end of the wedge-shaped structure seen in the towing direction.

In one embodiment of the invention is the attachment between the towing devices and the units made by means of welding, stitching-in, stitching-on, adhesive bonding, by means of suitable coupling devices or a combination of two or more methods of attachment in such a way that when the apparatus is under tow the towing forces are transferred and a desired geometrical shape of the apparatus is obtained.

In another embodiment of the invention is the wedge-shaped structure made having a roof portion provided with a V-shaped recess the legs of which form planing edges consisting of portions of the towing devices secured in the edge area and which intersect, the said planing edges being made rigid by the towing forces that are transferred to the planing edges when the apparatus is under tow.

In still another embodiment of the invention forms the wedge-shaped structure a tunnel having an inlet defined by the bottom of the wedge-shaped structure, side walls having a height equivalent to skirt, and the roof portion having a V-shaped recess, the said tunnel having an outlet that is located beneath the planing edges and approximately at their point of intersection, and where the cross-sectional area of the outlet is smaller than the cross-sectional area of the inlet.

In still another embodiment of the invention can the planning depth be adjusted by adjusting the towing speed or in that means are provided in the form of, for example, an auxiliary system that is connected to the wedge-shaped structure so that it is possible to ballast the system.

In still another embodiment of the invention is the collecting means or separator shaped as a receptacle having freeboard and a bottom bag is equipped with a bottom hatch, wherein the hatch opening can be varied from closed position to an opening which, when the system is under tow, causes "planed off" liquid to be caught or collected in the separator at a level above the level of the surface of the water outside the separator so that an overpressure is formed inside the bag which holds the bag in an extended state.

In still another embodiment of the invention is the bottom hatch designed as a flap arranged over an opening which may be equipped or reinforced with a netting portion in the bottom of the bag itself.

In still another embodiment of the invention is the hatch at its front end fastened to the bottom of the bag, and one or more elastic devices, for example, elastic cords, are preferably provided to adapt the closing/opening of the hatch and thus the bottom of bag according to the conditions of use such as towing at different speeds or standstill.

In still another embodiment of the invention may there be provided ballast means, e.g., one or more lead cables or the like in the bottom of the bag, which ensure suitable submersion or ballasting of the bag, especially at standstill of the system, and also the freeboard can be ballasted with the aid of suitable means.

If the difference in speed between a layer of oil and a layer of water is greater than about 1 knot, in general the oil will be carried along with the water. Oil or oil spills could thus inadvertently be lost under, e.g., a floating boom. The construction of a V-shaped tunnel, as in the present invention, will allow the underlying body of water to move at speed through the tunnel in the opening whilst the surface is pressed up. This results in the oil being exposed to an acceptable difference in speed and not being pulled under the tunnel.

Inside the separator the oil/water mixture will be almost motionless as the amount of liquid brought in is tiny in relation to the total volume of the separator.

With the apparatus or system according to the invention, oil can be effectively removed from the surface at a speed of 4 knots, which is 400% more than any previously known conventional floating boom (1 knot), and 260% more than previously known high-speed booms that can be used at a speed of about 1.5 knots.

The advantages obtained with the invention include the following:

- it can operate in waters where there are strong currents;
- it allows the boom to be used with greater efficiency;
- it has great advantages in rivers where there are current;
- it provides for better manoeuvrability of the tow vessels which can operated at a higher speed;
- the oil is concentrated in the separator so that the efficiency of pumps and skimmers is enhanced;
- the whole structure is non-rigid which means that it can be coiled onto a storage reel of small volume.

BRIEF DESCRIPTION OF THE DRAWINGS

The advantages and features of the disclosed invention will readily be appreciated by persons skilled in the artfrom the following detailed description when read in conjunction with the drawing wherein.

DETAILED DESCRIPTION OF THE DISCLOSURE

The apparatus or system according to the invention is essentially made of a suitable non-rigid and flexible material so that it can be stored on a reel. One example of a suitable material may be a sheet of a suitable plastic that is robust, weatherproof and resistant to oil (and chemicals). The apparatus comprises a forward tapered channel portion 1, a rear collecting means or separator portion 2, and between these portions a wedge-shaped structure 7.

Figure 4:
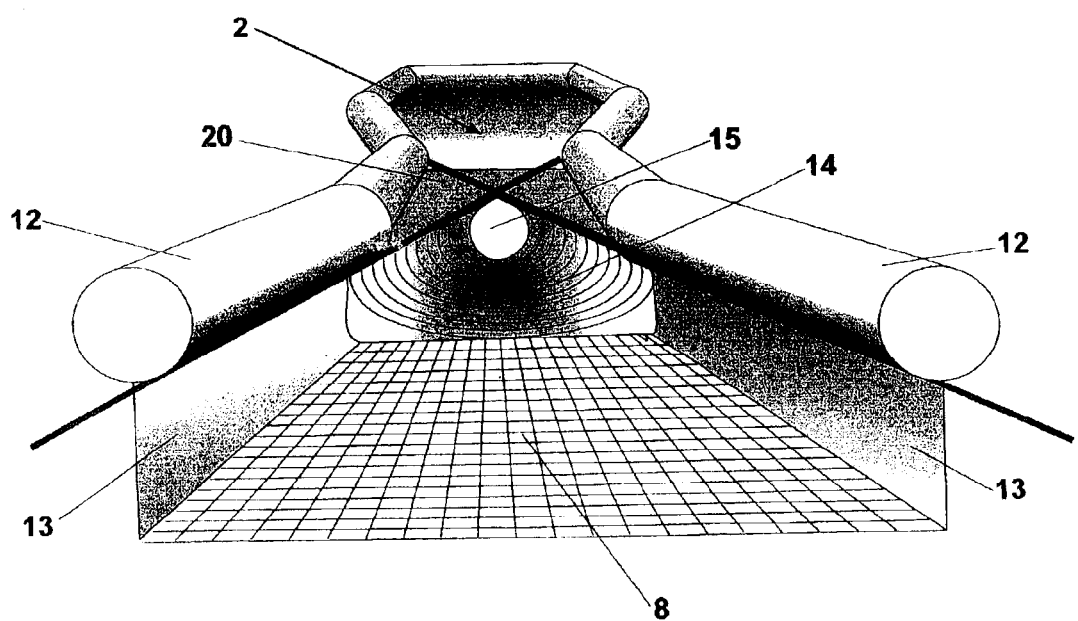
FIG. 4 is a schematic view of the oil collector seen from in front.

The tapered channel portion 1 is made in the form of two side-defining faces 3, 4 that extend from the wedge-shaped structure 7. The faces 3, 4 comprise freeboard 12 and skirt 13 and preferably an inlet bottom 8, as can be seen, for example, in FIG. 4. In addition to forming a "divide", this bottom 8, which may be in the form of a net, serves to maintain the shape of the tapered channel portion 1 and the inlet to the tunnel 14 of the wedge-shaped structure 7. The freeboard 12 is normally ballasted by means of the water pressure when the apparatus or system moves forward, but, if so desired, can also be ballasted by using suitable devices (not shown).

The oil collector is equipped with towing devices 5, 6 in the form of ropes, cords or similar means that are attached in an appropriate manner to the side-defining faces 3, 4, the wedge-shaped structure 7 and the collecting means or the separator 2. The towing devices 5, 6 run from the faces 3, 4 in an optional length and are both are preferably equipped with a suitably dimensioned conventional floating boom or coupled to such a boom (not shown). At their free ends, the devices 5, 6 or optionally the floating booms can be fastened to suitable tow means, for example, tow vessels.

The attachment between the devices 5, 6 and the "oil collector hull" can, for example, be made by welding, stitching-in, stitching-on, adhesive bonding, by means of suitable coupling devices or a combination of two or more of the listed methods of attachment. What is important is that when the collector is under tow the towing forces are transferred in such a way that a desirable geometrical form of the apparatus is obtained. This applies in particular to the tapered channel portion 1 and the wedge-shaped structure 7. An essential feature of the invention is that the wedge-shaped structure 7 is made having planing edges 9, 10. These consist of respective portions of the towing devices 5, 6 secured in the edge area, and which can be made rigid by the towing forces that are transferred to the planing edge when the collecting means 2 is under tow. An optimal planing depth would depend, inter alia, on anticipated oil thickness as the planing action should ensure that all oil that is not substantially mixed with the water is "planed off". This liquid is then transferred into the collecting means or the separator 2. The planing depth can be adjusted by adjusting the towing speed, but special means can also be provided for making this adjustment. Such means may consist of non-illustrated auxiliary system that is connected to the tapered channel so that it is possible to ballast the system.

Figure 2:
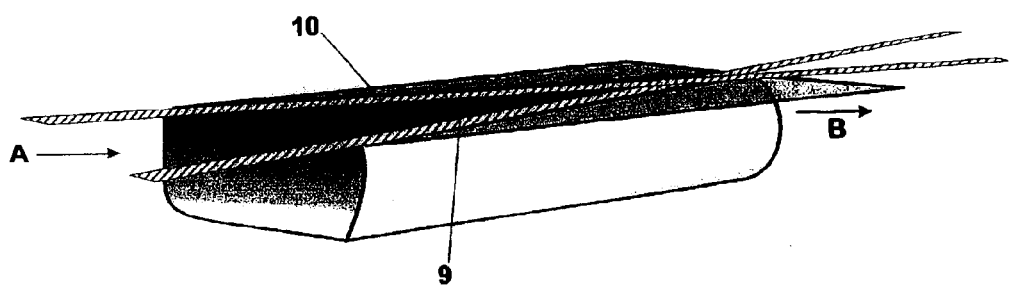
FIG. 2 is a schematic illustration of details of a wedge-shaped structure according to the invention.
Figure 3:
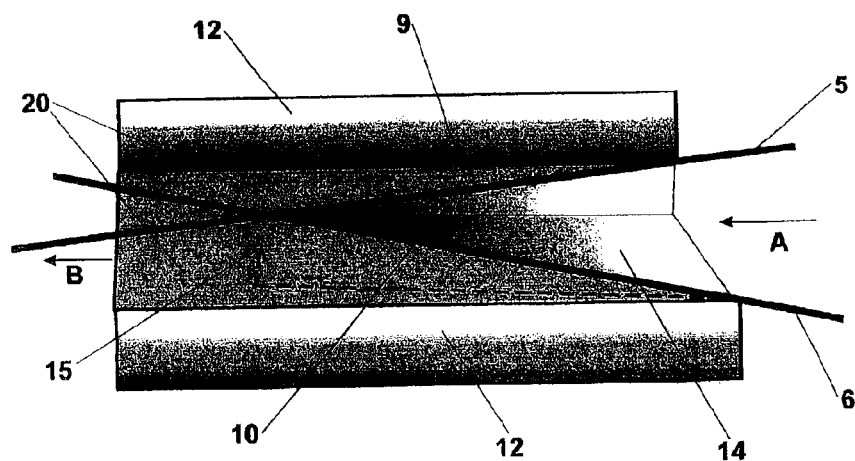
FIG. 3 is a schematic illustration of additional details of the wedge-shaped structure in FIG. 2.

FIGS. 2 and 3 are schematic illustrations of details of the wedge-shaped structure 7. The structure 7 is made having a tunnel 14 with an inlet in the channel portion 1, an outlet 15 and a roof portion 20. The roof portion 20 is made having a V-shaped recess where the legs of the recess form the planing edges 9, 10 consisting of portions of the devices 5, 6 secured in the edge portion. Arrows A and B illustrate respectively the inflow of an oil/water mixture and the outflow of mainly water. It is an essential point that the cross-sectional area of the tunnel 14 outlet 15 is smaller than the cross-sectional area at its 14 inlet. This means that some water is pressed up in such a way that the surface where most of the oil is found is lifted up and carried across the roof portion 20 and into the separator 2.

In the area of the wedge-shaped roof 20, at or preferably immediately downstream of the tip of the V-recess or the point of intersection between the devices 5, 6 or 9, 10, there may be arranged the edge of a wedge (not shown) which raises the oil flow during its transfer to the separator portion 2 and which can also act as an auxiliary barrier against backflow of oil during breaks in the towing of the oil collector.

Figure 1:
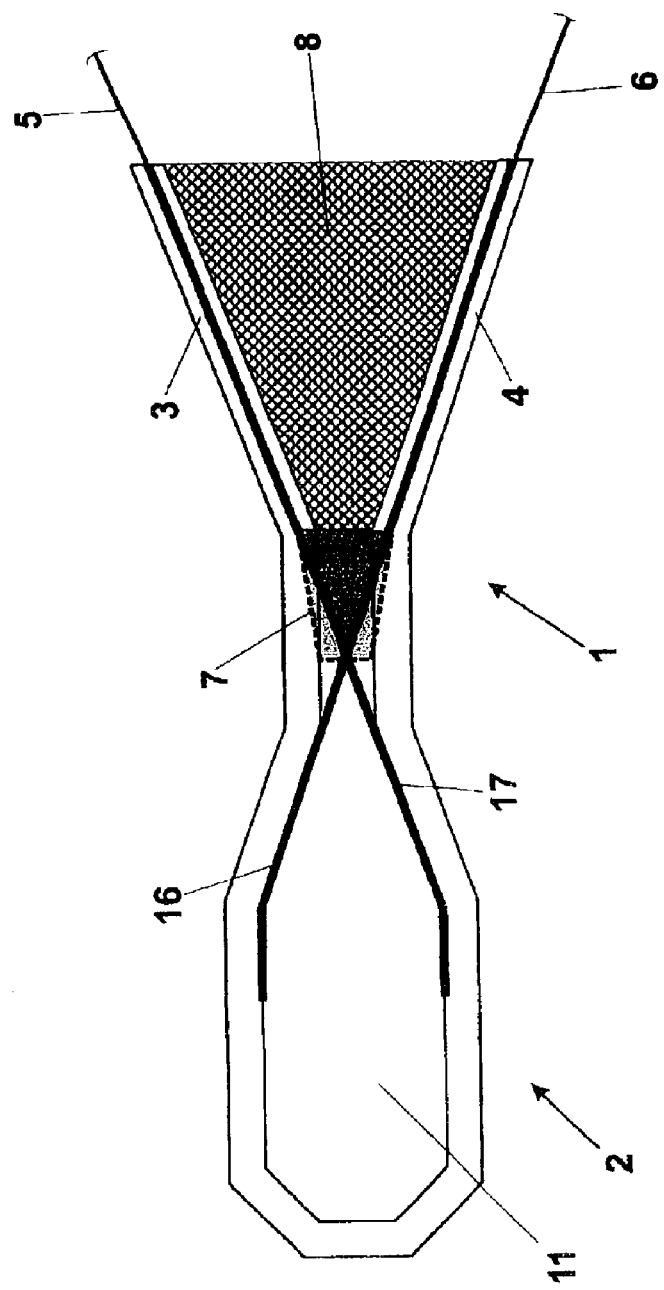
FIG. 1 is a schematic illustration of an oil collector that implements the principles of the invention.

The collecting means or separator portion 2 is made in the form of a receptacle having freeboard 12 and a bottom bag 11. If so desired, the free board 12, like the tapered channel portion, can be ballasted by using suitable means. In connection with the freeboard edges, attachment sections 16, 17 may be provided for the towing devices 5, 6 as indicated in FIG. 1. Furthermore, the bottom bag 11 is equipped with a bottom hatch 18. The bottom hatch 18 may be a suitable flap arranged over an opening which may be equipped or reinforced with a netting portion in the bottom of the bag itself. At its front edge the hatch 18 is attached in a suitable manner to the bottom of the bag 11. One or more elastic devices, for example, elastic cords, are preferably provided for adapting the closing/opening of the hatch 18 and thus the bottom 11 according to the conditions of use such as towing at different speeds or standstill.

In the bottom of the bag, one or more ballast means may be provided, as for instance, lead cable or the like (not shown), which ensure suitable submersion or ballasting of the bag, in particular when the system is stationary, to prevent the bottom from floating up.

The collecting means 2 functions as an intermediate storage tank from where the oil can be removed with the aid of, for example, one or more pump or skimmer vessels fitted with equipment suitable for this operation.

As stated in the introduction, the apparatus or system according to the invention is essentially made of a suitable non-rigid material. The indicated freeboard 12 is made of sections of fabric. These are shaped as basically cylindrical bodies that are interconnected or integrated with one another in such a way that a "hull shape" as shown schematically in FIG. 1 is obtained. The cylinders are inflatable and are filled with a suitable medium, for example, air or other suitable gas, a foam or other suitable more or less solid and easily manageable material.

When the apparatus is to be used to contain an oil spill and similar pollutants floating on the surface of a body of water, it is towed, preferably integrated with or connected to conventional floating booms by means of towing devices 5, 6 secured to, for example, two tow vessels (not shown).

The tow vessels are made to move such that the booms and the side-defining faces 3, 4 form a sweep opening, and the propulsion of the apparatus forces the oil spill towards the convergent opening of the tapered channel portion 1. The net in the inlet opening 8 allows water that is slightly polluted to pass through, whilst the oil spill passes on to the wedge-shaped structure 7 with the wedge-shaped tunnel 14 and the planing edges 9, 10. As mentioned, these edges ensure the "planing off" of oil and/or oil spills which are passed into the collecting tank 2, as indicated by the arrow C in FIG. 5 for intermediate storage and removal. Less polluted water/liquid runs out through the tunnel opening 15.

Due to the propulsion speed or towing speed, the water will be pressed into/up into the tunnel 14. This, in combination with the propulsion pressure, causes the liquid level in the separator 2 to be higher than the surface of the water otherwise, as indicated by the reference numeral 19 in FIG. 5. Since oil is lighter than water, the drops of oil that are mixed in the body of water will rise quite quickly to the liquid surface in the separator 2. The superelevation 19 in combination with the fact that the depth of the separator 2 is great in relation to the oil layer thus causes only non-polluted or slightly polluted liquid to be forced out through the hatch 18 in the bottom 11 of the separator 2 as indicated by arrow D.

When the system moves forward at a speed of, for instance, 4 knots, the front edge of the non-rigid bottom 11 of the separator 2 will be pressed backwards and upwards so that the bottom will be pressed in if the opening in the bottom hatch 18 is too large and the water inside the separator 2 is easily pressed out. However, when the opening in the hatch 18 is given a suitable throttling, the bottom 11, because of the superelevation 19 and thus the increased internal liquid pressure, will be stretched forcefully outwards and behave like a rigid structure, for example like steel. To give a specific example: at a superelevation 19 of 30 cm, where the bottom 11 is viewed as a sausage-shaped structure having a radius of 1.9 m, this will produce a tension in the fabric of about 550 kg/m. This rigid structure will behave like the hull of a boat that ploughs through the water, and creates calm conditions for the oil inside the separator 2.

Figure 5:
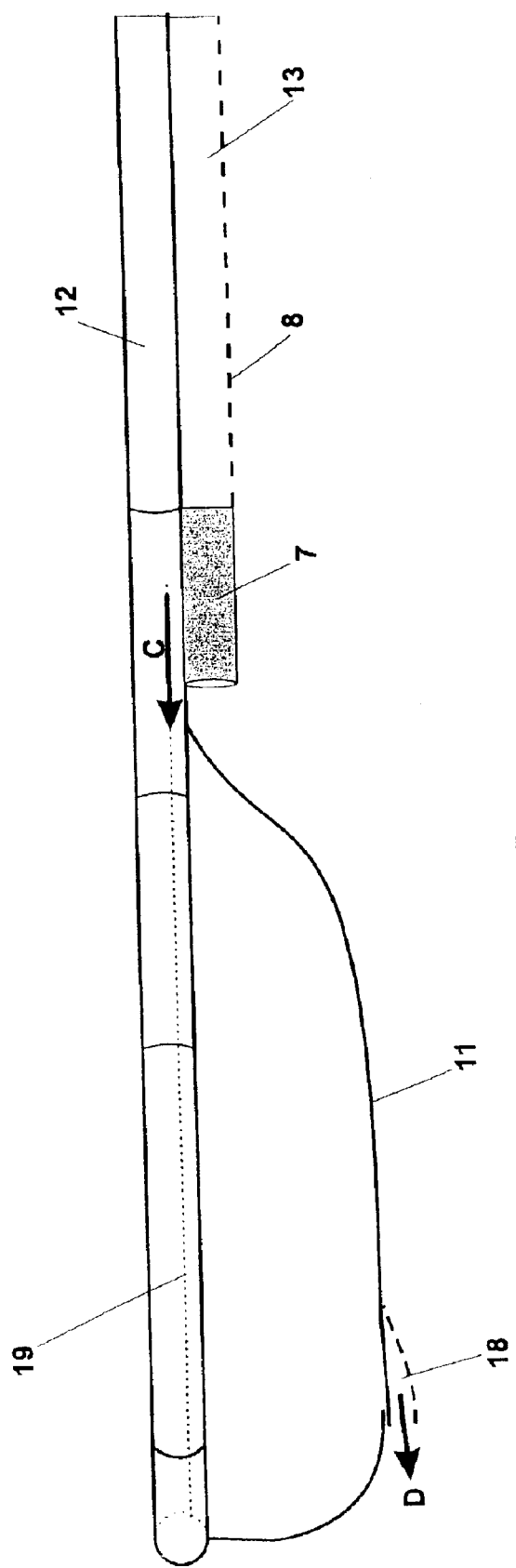
FIG. 5 is a schematic side view of the oil collector.

The size of the superelevation 19 is determined by the amount of oil/water that enters the separator 2 and the amount of water that exits through the opening of the bottom hatch 18. As the speed at which the system is towed increases, the amount of liquid in will increase, as will the pressure against the outer side of the bottom 11. Provided that the outlet opening of the bottom hatch 18 is adjusted correctly, the superelevation 19 will increase. Thus, the internal pressure in the separator 2 will rise, thereby ensuring that the increase in pressure on the outer side of the bottom 11 is more than offset and the separator 2 is maintained in an extended state. This adjustment is done empirically by adjusting the outlet opening, i.e., the area of the outlet hatch 18 itself and the hatch opening. The optimal hatch opening is provided in that a suitable number of elastic devices (not shown) such as elastic cords are provided in connection with the hatch 18 and the bottom 11, so that the hatch 18 closes almost completely when the system is stationary, and when the system is under tow it opens as desired/required under the influence of the increase in pressure resulting from the superelevation 19, the counterforce resulting from the pressure of the current against the hatch 18, and also the force from the elastic device(s). FIG. 5 shows the opening of the bottom hatch 18 in two positions.

The transfer of the towing forces and the design of the collecting means or separator 2 to ensure that a superelevation is obtained therein will normally be sufficient to ensure that the apparatus maintains its desired shape when in operation (tow or standstill). However, suitable bracing or rib means can be provided if so desired. Such means should/could be simple to put in place and remove after use.

Although the foregoing has been a description an illustration of specific embodiments of the invention, various modifications and changes thereto can be made by persons skilled in the art without departing from the scope and spirit of the invention as defined by the following claims.

What is claimed is:

1. An apparatus for containing contaminants floating on the surface of a body of water comprising:
    a tapered channel portion defined by two side-defining faces that diverge from one another from a narrow inner end to a wider opening end, said tapered channel portion being movable by a towing force;
    said two side-defining faces include a freeboard and a skirt;
    a wedge-shaped structure at said narrow inner end of said tapered channel portion with a wide end toward said tapered channel portion;
    a collecting portion at a narrow end of said wedge-shaped structure;
    said tapered channel portion, said wedge-shaped structure and said collecting portion form an integrated unit arranged in sequence and form a continuous hull;
    at least two longitudinal towing devices fastened respectively to each of said two side-defining faces, said wedge-shaped structure and said collecting portion, wherein said longitudinal towing devices intersect in an area at the narrow end of said wedge-shaped structure when the towing force is applied;
    wherein said integrated unit is composed of non-rigid materials; and
    said integrated unit becomes rigid when the towing force is applied to said longitudinal towing devices.

2. The apparatus as disclosed in claim 1, wherein the fastening between said longitudinal towing devices and said integrated unit is made by means of at least one of welding, stitching-in, stitching-on, adhesive bonding, or other suitable coupling devices.

3. An apparatus as disclosed in claim 2, wherein said wedge-shaped structure further comprises:

a roof portion having a V-shaped recess, wherein said V-shaped recess of the roof portion includes legs that define planing edges;

said planing edges including portions of said longitudinal towing devices secured in an edge area of said V-shaped recess; and said planing edges being made rigid by the forces transferred to said planing edges when the towing force is applied to said longitudinal towing devices.

4. An apparatus as disclosed in claim 3, wherein said collecting portion is a receptacle having a freeboard and a bottom bag equipped with a bottom hatch;

said bottom hatch including an open position and a closed position; and said bottom hatch adapted to vary between the open and closed position when the towing force is applied, which causes planed off liquid to be collected in said collector portion at a level above the level of the surface of water outside said collector portion due to an overpressure formed inside said bottom bag which holds said bag in an extended state.

5. An apparatus as disclosed in claim 1, wherein said wedge-shaped structure further comprises:

a roof portion having a V-shaped recess, wherein said V-shaped recess of the roof portion includes legs that define planing edges;

said planing edges including portions of said longitudinal towing devices secured in an edge area of said V-shaped recess; and said planing edges made rigid by the forces transferred to said planing edges when the towing force is applied to said longitudinal towing devices.

6. An apparatus as disclosed in claim 5, wherein:

said wedge-shaped structure forms a tunnel having an inlet defined by a bottom of said wedge-shaped structure and side walls having a height equivalent to the skirt;

said tunnel further having an outlet located beneath said planing edges and approximately at their point of intersection; and where a cross-sectional area of said outlet is smaller than a cross-sectional area of said inlet.

7. An apparatus as disclosed in claim 6, wherein the a planing depth can be is adjusted by adjusting varying the towing force speed or in that means are provided in the form of, for example, an auxiliary system that is connected to said wedge-shaped structure so that it is possible to ballast the system.

8. An apparatus as disclosed in claim 1, 2, 5, 6 or 7, wherein said collecting portion is a receptacle having freeboard and a bottom equipped with a bottom hatch;

said bottom hatch including an open position and a closed position;

said bottom hatch adapted to vary between the open and closed position when the towing force is applied, which causes planed off liquid to be collected in said collector portion at a level above the level of the surface of water outside said collector portion due to an overpressure formed inside said bottom bag which holds said bag in an extended state.

9. An apparatus as disclosed in claim 8, wherein said bottom hatch is designed as a flap arranged over an opening which includes a reinforced netting portion in said bottom bag.

10. An apparatus as disclosed in claim 9, wherein said bottom hatch includes a front edge and said bottom hatch is fastened at said front edge to said bottom with at least one elastic device to allow the opening and closing of said bottom hatch according to the applied towing force.

11. An apparatus as disclosed in claim 8, wherein said bottom hatch includes a front edge and said bottom hatch is fastened at said front edge to said bottom bag with at least one elastic device to allow the opening and closing of said bottom hatch according to the applied towing force.

12. An apparatus as disclosed in claim 11, wherein said bottom of said bottom bag includes a ballast to allow ballasting of said bottom bag.

13. An apparatus as disclosed in claim 7, wherein the planing depth is adjusted by including an auxiliary system connected to said wedge-shaped structure to ballast the system.

14. An apparatus as disclosed in claim 1, wherein the fastening between said longitudinal towing devices and said integrated unit is made such that when towing forces are transferred to said integrated unit a geometrical shape is created for said integrated unit.

* * * * *